(12) United States Patent
Zheng et al.

(10) Patent No.: US 9,964,967 B2
(45) Date of Patent: May 8, 2018

(54) SYSTEM AND METHOD FOR CONTROL PERFORMANCE MONITORING

(71) Applicants: Chevron U.S.A. Inc., San Ramon, CA (US); University of Southern California, Los Angeles, CA (US)

(72) Inventors: Yingying Zheng, Los Angeles, CA (US); Si-Zhao Qin, Los Angeles, CA (US); Michael Barham, Houston, TX (US)

(73) Assignees: CHEVRON U.S.A. INC., San Ramon, CA (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 88 days.

(21) Appl. No.: 13/774,561

(22) Filed: Feb. 22, 2013

(65) Prior Publication Data

US 2013/0226348 A1    Aug. 29, 2013

Related U.S. Application Data

(60) Provisional application No. 61/604,246, filed on Feb. 28, 2012, provisional application No. 61/712,592, filed on Oct. 11, 2012.

(51) Int. Cl.
  *G05D 21/02* (2006.01)
  *G05B 23/02* (2006.01)

(52) U.S. Cl.
  CPC ......... *G05D 21/02* (2013.01); *G05B 23/0237* (2013.01); *G05B 2219/42318* (2013.01); *G05B 2219/45031* (2013.01)

(58) Field of Classification Search
  CPC .......... G05D 21/02; G05B 2219/45031; G05B 2219/42318; G05B 23/0237
  USPC ....................................................... 700/282
  See application file for complete search history.

(56) References Cited

U.S. PATENT DOCUMENTS

| 5,646,600 A * | 7/1997 | Abdel-Malek et al. ...... 340/679 |
| 2007/0088446 A1* | 4/2007 | Srinivasan et al. ............. 700/32 |

OTHER PUBLICATIONS

Petros Ioannou et al., Robust Adaptive Control, University of Southern California Jun. 18, 2003 (reprint of the original from 1996).*
Thornhill et al., "Diagnosis of plant-wide oscillation through data-driven analysis and process understanding", Control Engineering Practice 11 (2003), pp. 1481-1491.
Thornhill et al., "Refinery-wide control loop performance assessment", Journal of Process Control 9 (1999), pp. 109-124.

(Continued)

*Primary Examiner* — Shogo Sasaki
(74) *Attorney, Agent, or Firm* — Pillsbury Winthrop Shaw Pittman, LLP

(57) ABSTRACT

A method for monitoring a control of a parameter of one or more devices or systems in an oil or gas production site includes receiving process data, the process data being a result of the control of the parameter of the one or more devices or systems in the production site; smoothing the process data using a polynomial filter while preserving features of the process data to obtain smoothed data; and applying a pattern recognition algorithm to the smoothed data to determine whether there is a malfunction condition in the one or more devices or systems.

19 Claims, 7 Drawing Sheets

(56) References Cited

OTHER PUBLICATIONS

Singhai et al., "A simple method for detecting valve stiction in oscillating control loops", Journal of Process Control 15 (2005), pp. 371-382.
Choudhury et al., "Detection and quantification of control valve stiction", (2014), pp. 1-6.
Thornhill et al., "Detection of multiple oscillations in control loops", Journal of Process Control 13 (2003), pp. 91-100.
Yu, "Data-driven approach for control performance monitoring and fault diagnosis", Dissertation, 2007, pp. 1-205.
He et al., "A curve fitting method for detecting valve stiction in oscillating control loops", Ind. Eng. Chem. Res. (2007), pp. 4549-4560.
Yet et al., "Statistical MIMO controller performance monitoring. Part I: Data-driven covariance benchmark", Journal of Process Control 18, (2008), pp. 277-296.
Yet et al., "Statistical MIMO controller performance monitoring. Part II: Performance diagnosis", Journal of Process Control 18, (2008), pp. 297-319.

\* cited by examiner

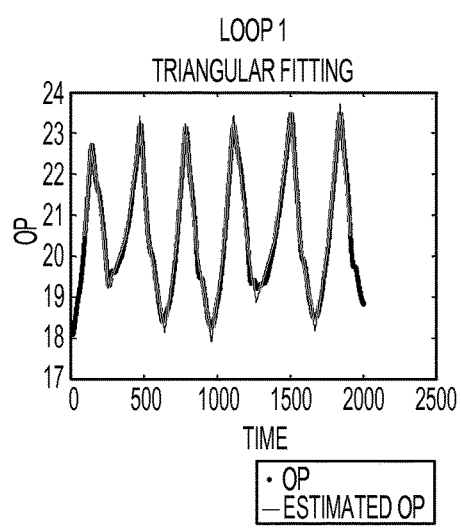
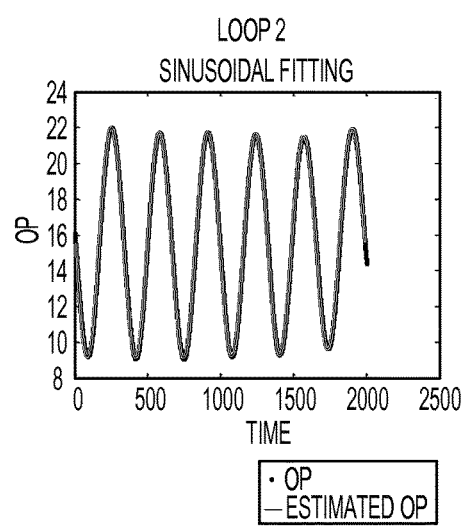
FIG. 6a
FIG. 6b

SYSTEM AND METHOD FOR CONTROL PERFORMANCE MONITORING

CROSS-REFERENCE TO RELATED APPLICATIONS

The present application is based on and claims priority to U.S. Provisional Application No. 61/604,246, filed on Feb. 28, 2012, and U.S. Provisional Application No. 61/712,592, filed on Oct. 11, 2012, the entire contents of both is incorporated herein by reference.

BACKGROUND

Field

The present invention relates generally to management of offshore platforms, and more particularly to remote monitoring of control systems.

Background

In remote operation of oil and gas fields (for example, offshore platforms), real time control systems must be well maintained for efficient and safe operations. Early detection of control and equipment performance is desired to implement a higher level integrated optimization as well to detect deterioration of the equipment and thus prevent failure. Poor control performance is often the result of undetected deterioration in equipment such, for example, control valves, inadequate performance monitoring, and poor tuning in controllers that control the equipment (e.g., the control valves) and process parameters.

SUMMARY

An aspect of an embodiment of the present invention includes a method for monitoring a control of a parameter of one or more devices or systems in an oil or gas production site includes receiving process data, the process data being a result of the control of the parameter of the one or more devices or systems in the production site; smoothing the process data using a polynomial filter while preserving features of the process data to obtain smoothed data; and applying a pattern recognition algorithm to the smoothed data to determine whether there is a malfunction condition in the one or more devices or systems.

Another aspect of an embodiment of the present invention includes a method of identifying a valve stiction condition including obtaining control loop data, the control loop data corresponding to performance of a control system, smoothing the control loop data using a polynomial fit filter, and applying a pattern recognition algorithm to the smoothed data to determine whether the valve is exhibiting a stiction condition. The term "valve stiction" is a well known term of art that generally describes the state when a valve is somewhat locked or "sticking" thus requiring more force to move the valve. Valve stiction condition may be a signal that the valve is malfunctioning and, if not resolved, this may potentially lead to a system failure.

An aspect of an embodiment may include a system for performing any of the foregoing methods. An aspect of an embodiment of the present invention includes a system including a data storage device and a processor, the processor being configured and programmed to perform the foregoing method.

An aspect of an embodiment of the present invention includes a system for monitoring a control of a parameter of one or more devices or systems in an oil or gas production site. The system includes a storage device configured to store process data, the process data being a result of the control of the parameter of the one or more devices or systems in the production site; and a processor in communication with the storage device, the processor being configured to: smooth the process data using a polynomial filter while preserving features of the process data to obtain smoothed data; and apply a pattern recognition algorithm to the smoothed data to determine whether there is a malfunction condition in the one or more devices or systems.

Aspects of embodiments of the present invention include computer readable media encoded with computer executable instructions for performing any of the foregoing methods and/or for controlling any of the foregoing systems.

DESCRIPTION OF THE DRAWINGS

Other features described herein will be more readily apparent to those skilled in the art when reading the following detailed description in connection with the accompanying drawings, wherein:

FIGS. 6a and 6b illustrate smoothed oscillation loops for two loops; and

DETAILED DESCRIPTION

Figure 1:
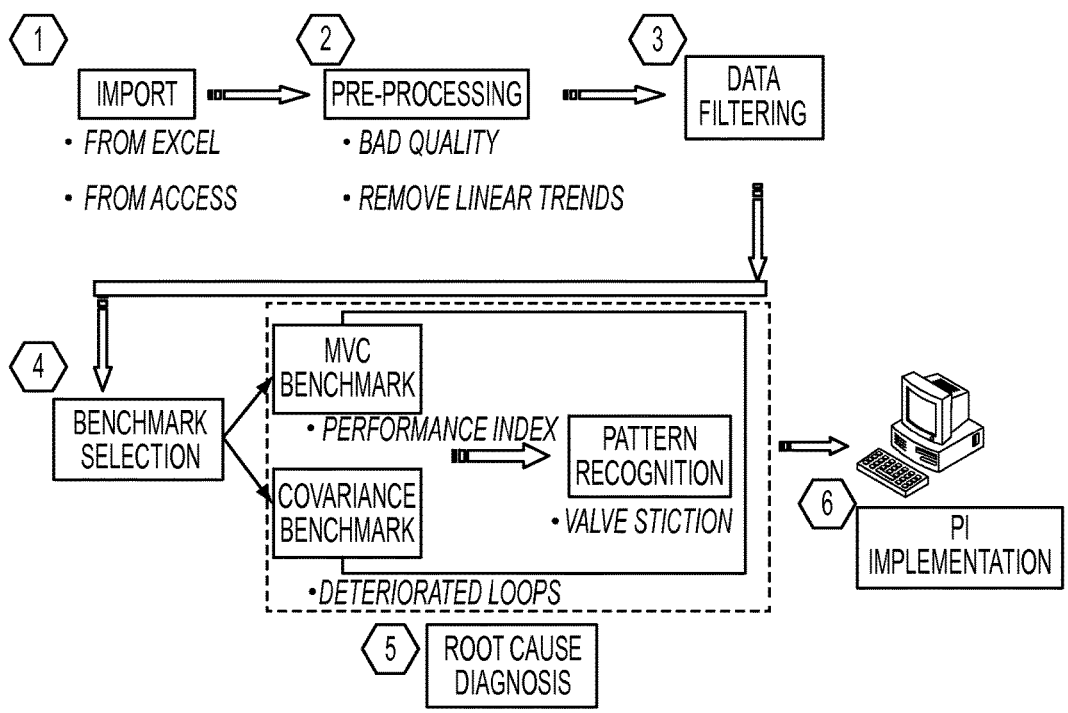
FIG. 1 is a flow chart illustrating a workflow for application of a method in accordance with an embodiment of the invention.

Decision making relies on field data to enhance oil or gas production, to monitor plant operations, improve product quality and ensure worker environmental safety. Data-driven techniques can be implemented to control performance monitoring; to provide quality-relevant fault detection; to provide dynamic data reconstruction with missing and faulty records, etc. Field data may include any type of process parameters such as, for example, temperature, pressure, flow rate, and/or how valves are acting (opening or closing of the valves, etc.) in response to a control system that sends signals to control the parameters (e.g., opening and closing of valves).

For example, in remote operation of offshore platforms, real time control systems need to be well maintained for efficient and safe operations. Early detection of control and equipment performance degradation may be needed. Poor control performance can be the result of a malfunction condition such as, without limitation, undetected deterioration in equipment (e.g., control valves), inadequate performance monitoring, or poor tuning in the controllers themselves (e.g., the controller not functioning properly or not functioning with the desired level of response in a feedback loop). The minimum variance control benchmark for single loops and the covariance benchmark for multi-loops can be used to detect deteriorated control variables. The co-variance benchmark is used to determine the directions with significantly worse performance versus the benchmark. For example, the Savitzky-Golay smoothing filter or SG smoothing filter can be combined with a curve fitting method to detect valve stiction (i.e., a valve control problem). The SG filter is able to preserve features of data distribution such as relative maxima, minima and/or widths. In addition, a valve stiction index can be used to indicate whether a valve stiction occurs. In one embodiment, the PI system from OSIsoft can be used as one implementation platform. Real-time data can be exchanged between the PI system and MATLAB from MathWorks via OPC (O L E for process control) interface. The OPC interface is a software application that acts as an application programming interface, for example, in this case between the Pi system and MATLAB.

In accordance with an embodiment of the present invention, data-driven approaches to monitoring control performance are applied to an oil or gas site (e.g., an offshore platform). In the following paragraphs, various embodiments of the methods and systems of control performance monitoring including identifying a problem condition or equipment malfunction condition in the production site (e.g., valve stiction) will be described with reference to an offshore platform. However, as it can be appreciated the systems and methods to monitoring control performance described herein are applicable to any oil or gas production site. Similarly, although the valve stiction problem or malfunction is used in the following paragraph as an example to illustrate various embodiments of the systems and methods for control performance monitoring, the application of the systems and methods described herein is not limited to only valve stiction but encompasses any problem or malfunction situation than can be encountered in an oil or gas production site.

A minimum variance control benchmark for single loops and a covariance benchmark for multi-loops are used to detect deteriorated control variables. The covariance benchmark is used to determine the directions with significantly worse performance versus the benchmark. For example, to detect valve stiction, a SG smoothing filter (or more generally, a moving polynomial fit filter) is combined with a curve fitting method. The SG filter is able to preserve features of data distribution such as relative maxima, minima and/or widths. In the case of valve stiction problem, for example, a stiction index may be used to indicate whether a valve stiction occurred. In one embodiment, real-time data is exchanged between PI and MATLAB via OPC interface.

Control system performance is one component of offshore platform operations. Control systems are designed to attain good overall performance, reliability, regulatory compliance, and safety. In a multi-level integrated optimization hierarchy, control systems work at the fastest time scale, which allows for early event detection.

As it can be appreciated, poorly conditioned control systems can make higher level data analysis and decision making unreliable. Therefore, a general objective of control systems health monitoring is to make sure that controllers perform at their best capability to maintain the process to the set point and minimize undesirable disturbances to the operations of other processes upstream or downstream of the controller.

To maintain optimum offshore platform performance, control loop performance is to be maintained within certain design specifications. This can be achieved by monitoring loop performance and taking appropriate corrective actions when poor performance is detected. However, the detection, diagnosis and resolution of these problems can be difficult, particularly in large and complex offshore platform systems.

In an embodiment, performance of control loops is monitored by using data-driven methods. The data analysis is intended to allow for the identification of several aspects of poor control and generate a list of problem loops with diagnoses of the individual problems so that the problems can be prioritized and corrected. Hence, data analysis in accordance with an embodiment of the invention may allow for identification and characterization of control loop issues.

FIG. 1 illustrates a workflow diagram illustrating a workflow for application of a method for identification and characterization of control loop issues, in accordance with an embodiment of the invention. As illustrated in FIG. 1, the method includes six steps. The first three steps are importing (step 1), pre-processing (step 2), and filtering the data (step 3). In one embodiment, the data can be imported from an EXCEL sheet or from ACCESS both programs from Microsoft Corporation, at step 1. At step 2, the data is pre-processed to determine bad quality data. At step 3, the data is filtered to remove noise. The filtered data is then processed for benchmark selection, at step 4. The bench mark selection includes analyzing the data by application of a minimum variance control (MVC) benchmark for single loops and application of a covariance benchmark for multi-loops, to detect deteriorated control variables. At step 5, a root cause diagnosis is performed. The root case diagnosis includes using a pattern recognition algorithm, in the illustrated case a curve fitting method, to detect valve stiction. In one embodiment, one or more of the above processes or steps may be performed in realtime.

In an embodiment, the method may be implemented as a MATLAB workflow. However, in certain circumstances, a MATLAB implementation may be impractical. For example, it may not be convenient for offshore platform engineers to use due to restrictions on the availability of workstation processing power. Thus, an alternate implementation may employ a PI System, available from OSIsoft of San Leandro, Calif. Frequently, in an offshore platform environment, PI System is already used as a process historian, for gathering event-driven data in real time, from multiple sources across the plant and/or enterprise. In particular, The PI-ACE (advanced computing engine) allows programming of complex calculations, and it can be used in VB.NET development environment, which provides the ability to call COM and .NET objects and a library of user-written functions. Therefore, in an embodiment, a PI-ACE module may be implemented in a VB.NET development environment in which the module may be provided with functionality for calling a library of MATLAB functions. Optionally, real time data could be exchanged between PI and MATLAB via an OPC interface using functionality provided in the MATLAB OPC toolbox and using a PI DA/HDA Server.

In a covariance monitoring scheme, a period of "golden" operation data, i.e., operation data from a time period during which the control system performance is considered satisfactory or desirable, can be used as a user-specified benchmark. Then, for a monitored time period, generalized eigenvalue analysis is used to extract directions of degraded control performance against the benchmark. Confidence intervals for the population eigenvalues can be derived on the basis of their asymptotic distribution. This can be used to determine directions or subspaces that exhibit worse performance than the benchmark performance. Finally, for the isolated subspaces that illustrate lower performance, covariance-based performance indices are derived to assess the performance degradation.

If the benchmark period is designated "I" and the monitored period is designated as "II", then the direction along which the largest variance ratio p of the monitored period versus the benchmark period can be determined using equation (1), as follows:

$$p = \text{argmax} \frac{p^T \text{cov}(y_{II}) p}{p^T \text{cov}(y_I) p}. \tag{1}$$

Where cov ($y_{II}$) is the covariance of the monitored period and cov ($y_I$) is the covariance of the benchmark period.

The solution of equation (1) is equivalent to the following generalized eigenvalue analysis provided in relationship (2).

$$\text{cov}(y_{II}) p = \lambda \text{cov}(y_I) p \tag{2}$$

where $\lambda$ is the generalized eigenvalue and p is the corresponding eigenvector. The eigenvector corresponding to the largest generalized eigenvalue $\lambda_{max}$ represents the direction of the largest variance inflation in the monitored period against the benchmark period. This direction is referred to as worst performance direction.

The covariance performance index $I_v$ is defined by the following equation (3).

$$I_v = \frac{|\text{cov}(y_{II})|}{|\text{cov}(y_I)|} \tag{3}$$

where $|\cdot|$ is the determinant.

The covariance can be further expressed by the following equation (4).

$$I_v = \frac{|\text{cov}(y_{II})|}{|\text{cov}(y_I)|} = |\Lambda| = \prod_{i=1}^{q} \lambda_i \tag{4}$$

To examine the significance of population eigenvalues $\lambda_i$ with respect to a threshold value, the confidence intervals for the population eigenvalues are derived on the basis of their asymptotic distribution. The lower bound and the upper bound of the confidence interval are denoted as $L(\lambda_i)$ and $U(\lambda_i)$. If the lower bound of the confidence interval is greater than one ($L(\lambda_i) > 1$), then the control performance of the monitored period is worse than the control performance of the benchmark period.

To identify the controlled variables responsible for performance degradation, an angle between each individual variable and a worse performance subspace may be examined. The cosine of the angle may be defined as the contribution index. If the index is close to one, it indicates that the angle approaches zero and the variable is virtually in the worse subspace. This may be interpreted to mean that the corresponding controlled variable contributes significantly to the performance degradation. If the index is near zero, the angle is near 90° and the corresponding controlled variable has little contribution to the worse subspace. A threshold value of 45° may be selected as distinguishing between variables that make important contributions to those that do not. Although the cosine is used herein, as it can be appreciated, the sine of the angle may be used instead. In which case, if the sine is defined as the contribution index, and if the index is close to zero, it indicates that the angle approaches zero deg., and if the index is close to one, it indicates that the angle is close to 90°.

The contribution index can be denoted as $\cos(\theta_k)$. It can be defined by the following equation (5).

$$\cos(\theta_k) = \frac{\|\hat{e}_k\|}{\|e_k\|} = \|\hat{e}_k\| \tag{5}$$

Where $e_k = [0 \ldots 0_{k-1} \ 1 \ 0 \ldots 0]^T$ is the $k^{th}$ unit vector and represents the $k^{th}$ controlled variable. $\hat{e}_k$ is the projection of unit vector $e_k$ onto the worse subspace P.

It can be further expressed as equation (6).

$$\cos(\theta_k) = \left\|(\tilde{P}^T \tilde{P})^{-\frac{1}{2}} (\tilde{P}^T e_k)(e_k^T e_k)^{-\frac{1}{2}}\right\| \tag{6}$$

where $\tilde{P}$ is the orthonormal basis transformed from P.

In an embodiment, the confidence interval could be derived from the asymptotic statistics of a canonical correlation. Then, if the index is larger than the upper bound of the interval, the corresponding variable can be determined as a contributor to the worse subspace.

When control loops are operating incorrectly, the control loops can produce oscillations. This may result in plant performance degradation. Oscillations in control loops may be caused either by problems with controller tuning (i.e., over or underdamped loops), disturbances, or the presence of non-linearity, such as static friction, dead-zone, and hysteresis. For example, valve stiction is one of the most severe sources of oscillations in fluid process control systems. Approaches have been tried for automated identification of causes of oscillations. For example, it has been proposed that a curve fitting method may be used to distinguish oscillations due to sticking valves from those due to control instability or external disturbances. In one embodiment, valve stiction tends to cause a triangular type of oscillation at the output of an integrating element. Whereas, aggressive controller tuning and external oscillating disturbances tend to cause a sinusoidal wave at the output of an integrating element.

Typically, data acquired in the field are noisy. The application of data smoothing can enable measurement of a slowly varying variable that is contained in a signal that includes random noise that generally presents as higher frequency information.

One suitable approach to a smoothing filter is using the Savitzky-Golay (SG) method. This method essentially performs a local polynomial regression on a series of values to determine a smoothed value. As noted above, this approach is able to preserve features of the distribution such as relative maxima, minima, and/or width, which are usually 'flattened' by other adjacent averaging techniques.

To illustrate the Savitzky-Golay (SG) method, consider the specific example in which five data are used to approximate a quadratic polynomial. The polynomial can be expressed in the form of equation (7).

$$\text{poly}(i) = a_0 + a_1 i + a_2 i^2 \tag{7}$$

where the coefficients $a_0$, $a_1$ and $a_2$ are determined from the simultaneous equations in which the abscissa i is the index of for the data. The origin is always placed at the central data. Therefore, the abscissa values corresponding to each of the 5 point data are $\{-2,-1,0,1,2\}$.

The following equation (8) provides the result of multiplying the coefficients a of the polynomial by matrix A to obtain evenly spaced data f.

$$\begin{bmatrix} 1 & -2 & 4 \\ 1 & -1 & 1 \\ 1 & 0 & 0 \\ 1 & 1 & 1 \\ 1 & 2 & 4 \end{bmatrix} \begin{bmatrix} a_0 \\ a_1 \\ a_2 \end{bmatrix} = \begin{bmatrix} f_{-2} \\ f_{-1} \\ f_0 \\ f_1 \\ f_2 \end{bmatrix} \text{ or } Aa = f \quad (8)$$

where the evenly spaced data $\{f_{-2}, f_{-1}, f_0, f_1, f_2\}$ are selected with the target of replacing the value for $f_0$ with the value for the polynomial at $i=0$ or $p(0)=a_0$. The coefficients to the polynomial are determined in the least-squares sense. The normal equation is: $A^T A a = A^T f$ or $a = (A^T A)^{-1} A^T f$.

The top row of $(A^T A)^{-1} A^T$ yields the prescription for computing the value of $a_0$, as expressed in the following equation (9).

$$a_0 = [s_0, s_1, s_2, s_3, s_4] \begin{bmatrix} f_{-2} \\ f_{-1} \\ f_0 \\ f_1 \\ f_2 \end{bmatrix} \quad (9)$$

Thus, for each set of five such data, the central data can be replaced by the value determined for $a_0$.

In an embodiment, raw controller output (OP) or process variable (PV) data are treated with a Savitzky-Golay smoothing filter first, and then a curve fitting method is applied to detect valve stiction.

Both sinusoidal fitting and triangular fitting may be performed to the smoothed data. The mean squared errors (MSE) for both fitting methods are calculated. Then a stiction index is defined as the ratio of the MSE value of the sinusoidal fitting to the summation of the MSE values of both the sinusoidal and triangular fittings:

$$SI = \frac{MSE_{sin}}{MSE_{sin} + MSE_{tri}} \quad (10)$$

Once the stiction index (SI) is calculated, a rule may be applied to categorize the presence or absence of stiction. In this regard, ranges in which stiction is more likely may be distinguished from ranges in which stiction is less likely, and an intermediate range in which a determination may be difficult to make. In one embodiment, the following rules for binning the stiction index SI are proposed:

$SI \leq 0.4$ if there is no stiction;
$0.4 < SI < 0.6$ undetermined; and
$SI \geq 0.6$ if there is stiction.

A method in accordance with an embodiment of the invention was performed on data collected from a particular offshore platform. In one example, the data were collected at five second intervals and selected control loops were examined. In the example, the selected loops were among those considered key by subject matter experts.

For a system with time delay, a portion of the output variance is feedback control invariant. The performance index η is defined by the following equation (11).

$$\eta = \frac{J_{MV}}{\text{var}(y)} \quad (11)$$

where $J_{MV}$ is the minimum variance.

The minimum variance may be obtained from routine data using methods familiar to those of ordinary skill in the art. If the performance index η is close to 1, then further reduction in the output variance is not possible by re-tuning the controller (i.e., output variance is being affected by something other than controller characteristics), and the output variance can be reduced by process re-engineering. If the performance index η is close to 0, then there is high potential for reducing the output variance by re-tuning the existing controller. The difference (1−η) would represent the potential for improvement.

In an exemplary embodiment, eight individual control loops of the offshore platform were studied. First, a minimum variance of each loop was obtained from the routine data, and then a performance index was calculated, and then the potential for improvement was obtained.

Figure 2:
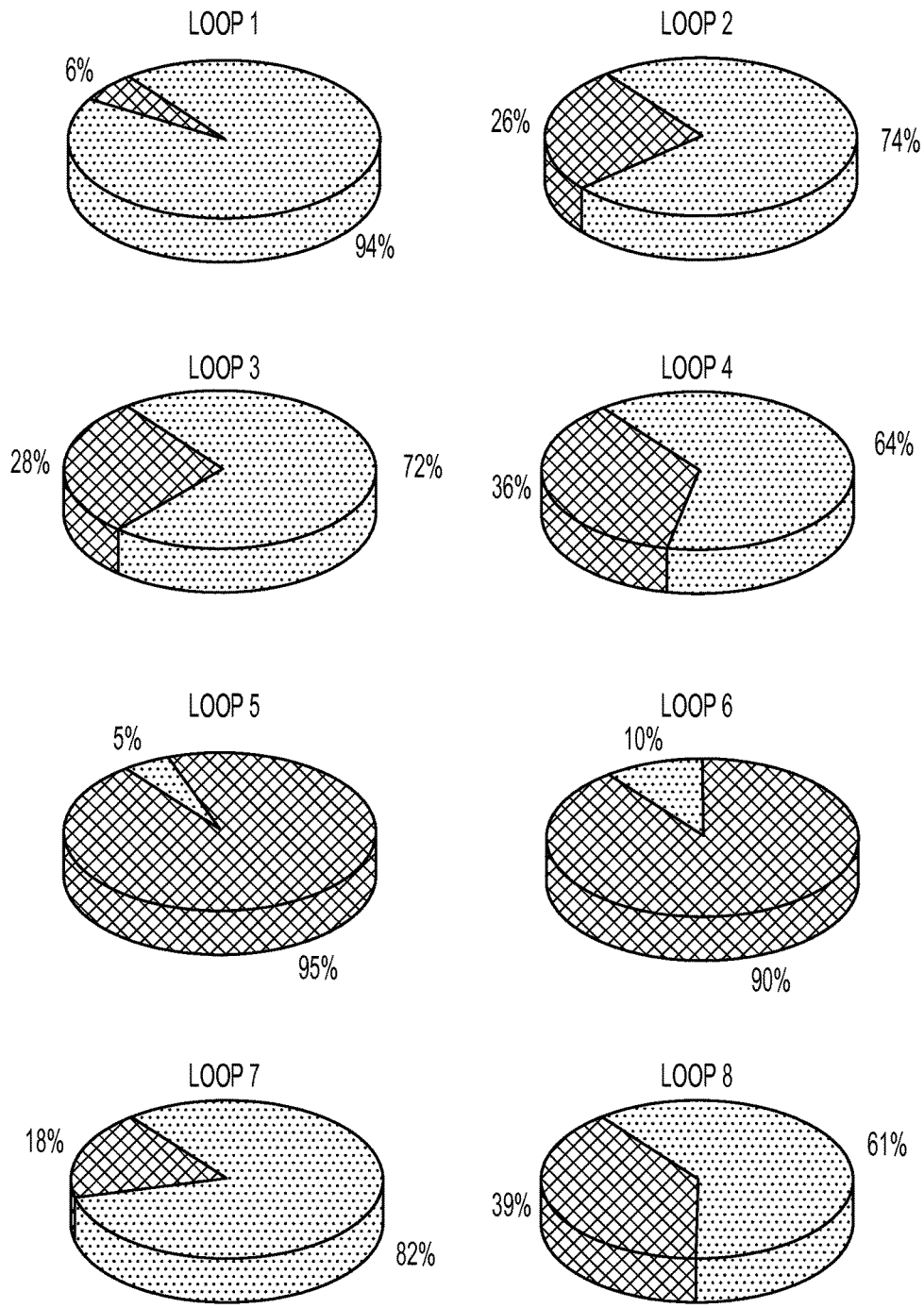
FIG. 2 illustrates performance index for eight control loops.

FIG. 2 illustrates performance index for the eight control loops. The dark portion of each graph represents the performance index η for a corresponding loop (loop 1, loop 2, ..., loop 8) and the lighter portion represents the difference (1−η).

As can be appreciated, FIG. 2 shows that loops 1-4, 7 and 8 appear to have a good potential improvement in output variance as their performance index is relatively lower (6% for loop 1, 26% for loop 2, 28% for loop 3, 36% for loop 4, 18% for loop 7 and 39% for loop 8). On the other hand, loops 5 and 6 do not need controller re-tuning as their performance index is relatively higher (95% for loop 5 and 90% for loop 6).

Four loops of the platform were examined by comparison to a benchmark. As described above, a period of good operation data was defined as benchmark performance, and a subsequent period of operation was monitored.

Figure 3A:
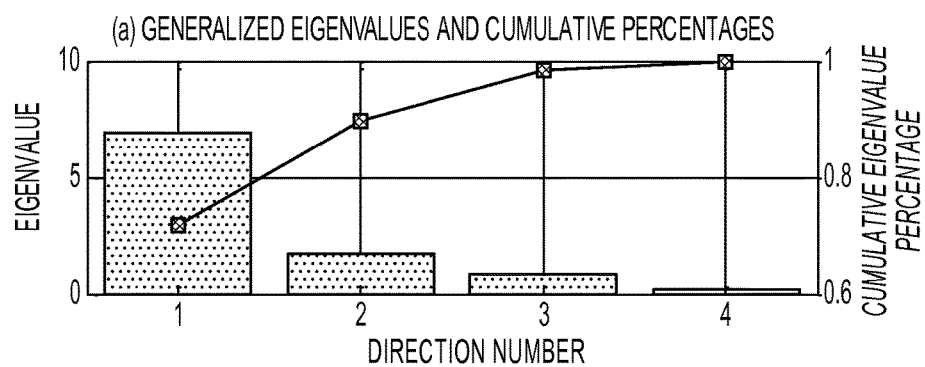
FIGS. 3a-3b illustrate results of covariance analysis of four loops.
Figure 3B:
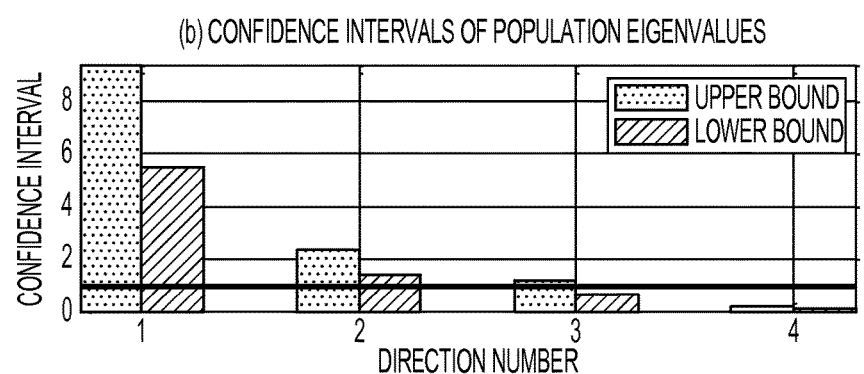

FIGS. 3a-3b illustrate results of covariance analysis of the four loops. FIGS. 4a-4d illustrate directions for eigenvectors for the four loops of FIGS. 3a-3b. Results of eigenvalue analysis between covariance matrices of benchmark and monitored data are illustrated in FIGS. 3a-3b (eigenvalues) and FIGS. 4a-4d (eigendirections). There are four eigenvalues and four corresponding eigendirections. The direction number refers to the first, second, third, and fourth eigendirection. In FIG. 3a, the bar values are the eigenvalues for the corresponding eigendirections, and the line passing through the squared-dots represents cumulative percentage for the eigenvalues. Higher eigenvalues can be interpreted as worse performance. In FIG. 3b, the confidence intervals of population eigenvalues are shown. For each eigendirection (i.e., direction number), the higher bar represents the upper bound, and the adjacent lower bar represents the lower bound. As shown in FIG. 3b, the lower bounds of eigenvalues for the first two eigendirections exceed the threshold value line (shown across the bars). Consequently, the first two eigendirections (i.e., eigendirection 1 and eigendirection 2) are determined as corresponding to the worse directions.

Figure 4A:
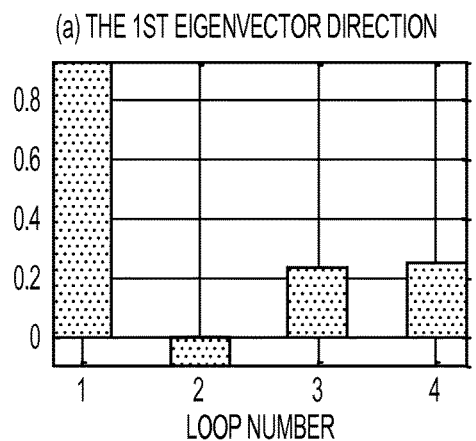
FIGS. 4a-4d illustrate directions for eigenvectors for the four loops of FIGS. 3a-3b.
Figure 4B:
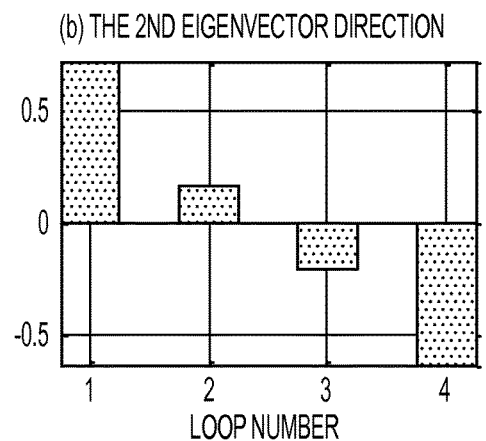
Figure 4C:
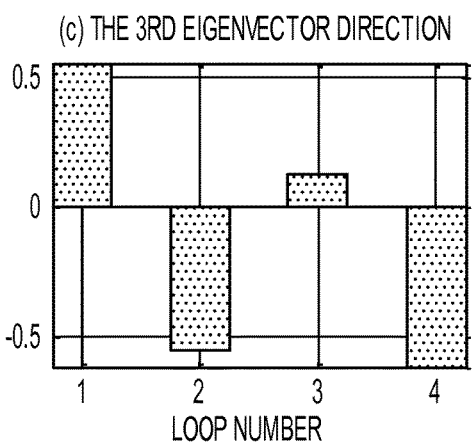
Figure 4D:
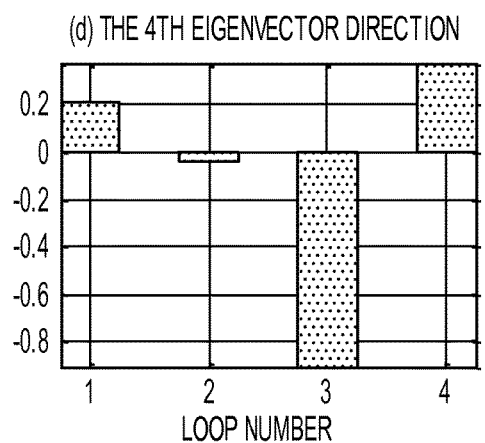

FIGS. 4a-4d represent the contribution of each loop to each eigendirection. As shown in FIG. 4a, Loop 1 contributes most significantly in the worst eigendirection.

The calculated overall performance index $I_v$ is 1.53, and thus the volume of the monitored data is 1.53 times of the benchmark data. The overall performance index is calculated from equation (4). It is the product of all the eigenvalues. FIG. 3a shows all the four eigenvalues. The four eigenvalues are 6.9015, 1.7351, 0.8537 and 0.1493, respectively. The overall performance index 1.53 is obtained by multiplying all the eigenvalues for the respective eigendirections as follows: 6.9015*1.7351*0.8537*0.1493=1.53. This implies that the overall control performance of the monitored period is inferior to the performance of the benchmark period, which is to be expected if the benchmark period was well-chosen as a period of good operation data.

By examination of the eigenvalue and eigendirection shown in the Figures, it can be observed that control performance is degraded along particular directions. For example, the maximum eigenvalue is over five (see FIG. 3a), which means the variance along the first eigenvector direction is increased by a factor of at least five. This represents a clear degradation of control performance during the monitored period with respect to the performance during the benchmark period, along this eigendirection. The eigendirection provides a measure of control loop performance that is a more direct and detailed form of the signal to noise ratio. The eigendirection indicates how bad the performance is. The magnitude of the eigenvalue relates to the amount of acceptable control loop performance degradation. It is desirable that the amount of degradation not contribute to the variability in the process parameters such that the resulting noise is greater than the desired parameter's condition.

Figure 5:
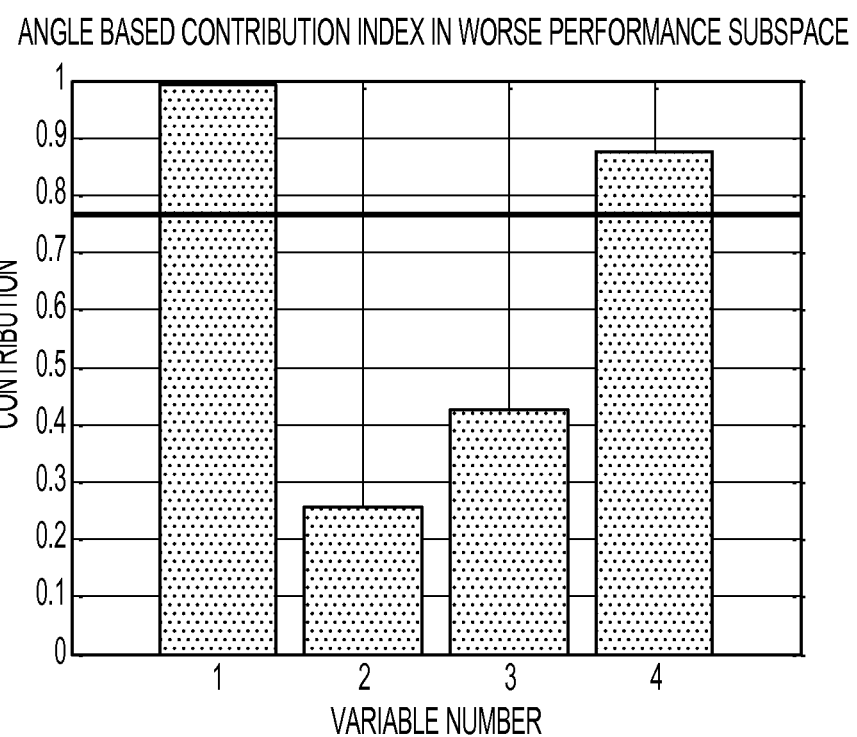
FIG. 5 illustrates an angle based contribution for the four loops.

FIG. 5 illustrates an angle-based contribution for each of the four loops. In this chart, the horizontal line represents a 95% control limit. As shown in FIG. 5, both Loop 1 and Loop 4 exceed the limit or threshold (represented in FIG. 5 by a line across the bars). Therefore, both Loop 1 and Loop 4 are contributors to the worse performance. Loop 1 is even more significant than Loop 4.

Next, two oscillation loops of the offshore platform are examined. A Savitzky-Golay (SG) smoothing filter with order three and window size 41 was applied to the OP data. The window size can be selected so that the shape of the data can be best preserved while the noise can be filtered out. In this case, the SG filter is applied on the data with several different windows sizes. However, it is determined that a window size of about 41 works well to preserve the shape of the data (e.g., preserve the maxima in the data, minima in the data, or width of the oscillation in the data, or any combination thereof) while substantially filtering out or removing noise. Curve fitting was applied to the raw and smoothed data. FIGS. 6a and 6b are plots showing the results from the smoothed data.

The stiction index of loops one and two for the smoothed data were 0.81354 and 0.0099, respectively. Application of the binning rules indicates that oscillation in loop one was likely caused by valve stiction, while oscillation in loop two was very unlikely to be stiction related. Thus, it can be inferred that the loop-two oscillation was likely due to an unstable controller or an external disturbance.

The stiction index of loops one and two for the raw data were 0.8092 and 0.0116, respectively. Though the conclusions that may be drawn from these stiction indexes are the same as those for the smoothed data, it is clear that the smoothing filter has increased the stiction index for loop one and decreased it for loop two. That is, the discrimination performance of the smoothed data is improved relative to the raw data.

As will be appreciated, the method as described herein may be performed using a computing system having machine executable instructions stored on a tangible medium. The instructions are executable to perform each portion of the method, either autonomously, or with the assistance of input from an operator. In an embodiment, the system includes structures for allowing input and output of data, and a display that is configured and arranged to display the intermediate and/or final products of the process steps. A method in accordance with an embodiment may include an automated selection of a location for exploitation and/or exploratory drilling for hydrocarbon resources.

In some embodiments, programs for performing the methods or services in accordance with embodiments of the invention can be embodied as program products in a computer system such as a personal computer or server or in a distributed computing environment comprising a plurality of computers. The computer may include, for example, a desktop computer, a laptop computer, a handheld computing device such as a PDA, a tablet, etc. The computer program (e.g., server program, client program) products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

Figure 7:
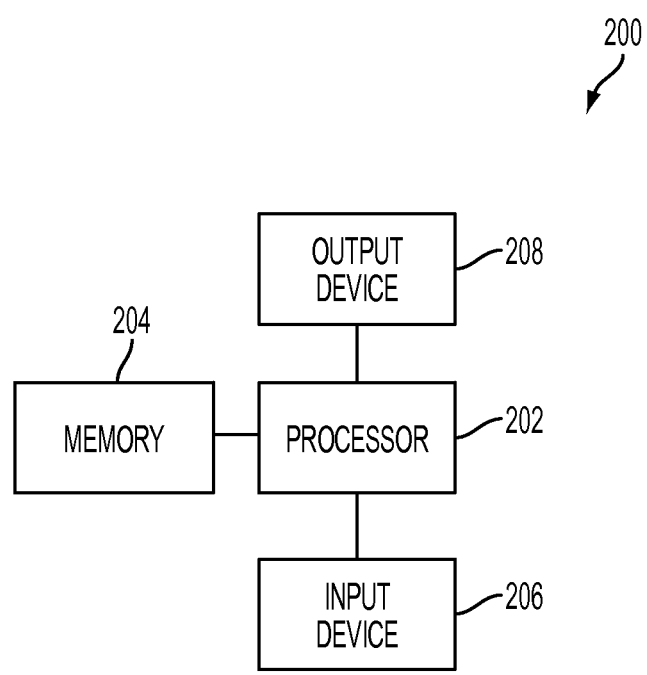
FIG. 7 is an example of a computer system for implementing the method, according to an embodiment of the present invention.

FIG. 7 is a schematic diagram representing a computer system 200 for implementing the methods, for example embodied as program products, according to an embodiment of the present invention. As shown in FIG. 7, computer system 200 comprises a processor (e.g., one or more processors) 202 and a storage device or memory 204 in communication with the processor 202. The computer system 200 may further include an input device 206 for inputting data (such as keyboard, a mouse or the like) and an output device 208 such as a display device for displaying results of the computation.

As it can be appreciated from the above paragraphs, in one embodiment, a method, implemented by the computer system, for monitoring a control of a parameter of one or more devices or systems in an oil or gas production site is provided. The method includes receiving, by the computer system, process data, the process data being a result of the control of the parameter of the one or more devices or systems in the production site. The method further includes smoothing, by the computer system, the process data using a polynomial filter while preserving features of the process data to obtain smoothed data. The method also includes applying, by the computer system, a pattern recognition algorithm to the smoothed data to determine whether there is a malfunction condition in the one or more devices or systems.

In one embodiment, applying a pattern recognition includes applying a fitting method to the smoothed data to determine whether there is a malfunction condition in the one or more devices or systems. For example, the control parameter includes a temperature, a pressure, a fluid flow rate, or an operation of a valve, or a combination thereof. For example, the one or more devices or systems may be a valve and the malfunction condition may include a valve stiction.

The method may further include determining, by the computer system, a stiction index of the valve by applying a fitting method to the smoothed data. The method may also include calculating, by the computer system, the stiction index as a ratio between a mean squared error value of a sinusoidal fitting of the smoothed data to a summation of the mean squared error value of the sinusoidal fitting to the smoothed data and a mean squared error value of a triangular fitting to the smoothed data. In one embodiment, when the stiction index is smaller than a threshold value, it is determined that there substantially no stiction of the valve, and when the stiction index is greater than the threshold value, it is determined that there is stiction in the valve.

In one embodiment, the smoothing includes smoothing the process data while preserving features of the process data including maxima, minima, and/or width in oscillation within the process data. For example, the smoothing can be performed by applying a Savitzky-Golay (SG) method to the process data. When applying the SG method, a smoothing window can be selected depending on a period of oscillation in the process data.

As it can be further appreciated from the above paragraphs, there is also provided a method of identifying a valve stiction condition. The method includes obtaining control loop data, the control loop data corresponding to performance of a control system. The method further includes smoothing the control loop data using a polynomial fit filter. The method also includes applying a pattern recognition algorithm to the smoothed data to determine whether the valve is exhibiting a stiction condition. As stated above, the smoothing may be performed using a Savitzky-Golay smoothing filter. The pattern recognition algorithm may include a curve fitting method. For example, the curve fitting method may include calculating a sinusoidal fitting, calculating a sawtooth fitting; and calculating a stiction index, based on the sinusoidal fitting and the sawtooth fitting.

In one embodiment, calculating the stiction index may include comparing a mean square error of the sinusoidal fitting and the sawtooth fitting. For example, the comparing may include evaluating equation (10) provided in the above paragraphs, $$SI = \frac{MSE_{sin}}{MSE_{sin} + MSE_{tri}},$$

where $MSE_{sin}$ is the mean square error of the sinusoidal fitting and $MSE_{tri}$ is the mean square error of the sawtooth fitting, and SI is the calculated stiction index. In one embodiment, when the stiction index is greater than a threshold value, the stiction condition is indicated.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method of controlling a device in a hydrocarbon production site comprising:

operating a plurality of physical devices or systems in the hydrocarbon production site;

receiving, by a computer system, representative benchmark process data from the plurality of physical devices or systems in the hydrocarbon production site for a period of time of normal operation, wherein each physical device or system includes at least one valve, and wherein each valve is controlled by a controller system using one or more loops, and wherein the representative benchmark process data is selected from the group consisting of temperature, pressure, fluid flow rate, operation of a valve, and any combination thereof;

receiving, by the computer system, real-time process data from the plurality of physical devices or systems outside the period of time of said normal operation, the real-time process data being selected from the group consisting of real-time measured temperature, pressure, fluid flow rate, operation of the valve, and any combination thereof;

applying, by the computer system, a data-driven covariance benchmark algorithm to the real-time process data and the benchmark process data corresponding to the one or more loops to determine whether the real-time process data from the plurality of devices deviates from the benchmark process data from the plurality of devices;

in response to determining that the real-time process data deviates from the benchmark process data indicating a degraded one or more loops in the one or more loops, applying, by the computer system, an angle-based contribution algorithm to determine which one or more loops in the one or more loops are degraded, wherein a degraded one or more loops in the one or more loops is indicative of a deteriorating condition of one or more controllers controlling one or more physical devices or systems or a deteriorating condition of the one or more physical devices, or both;

applying, by the computer system, a Savitzky-Golay smoothing filter to the real-time process data for each degraded control loop of the one or more degraded loops while preserving features of the real-time process data corresponding to the degraded one or more loops to obtain smoothed data;

applying, by the computer system, a pattern recognition algorithm to the smoothed data to determine whether a valve stiction condition exists in a valve corresponding to each degraded control loop, wherein the pattern recognition algorithm comprises a curve fitting method, wherein the curve fitting method further comprises calculating a sinusoidal fitting, calculating a sawtooth fitting, and calculating a stiction index based on the sinusoidal fitting and the sawtooth fitting and based on a value of the calculated stiction index determining that the valve stiction condition exists in the valve corresponding to each degraded control loop; and in response to determining that the valve stiction condition exists in the valve corresponding to each degraded control loop using the pattern recognition algorithm, taking corrective action to resolve the valve stiction.

2. The method according to claim 1, wherein if the stiction index is smaller than a threshold value it is determined that there is substantially no stiction of the valve, and if the stiction index is greater than the threshold value, it is determined that there is stiction in the valve.

3. The method according to claim 1, wherein applying, by the computer system, the Savitzky-Golay smoothing filter comprises filtering the degraded real-time process data while preserving features of the degraded real-time process data, the features being selected from the group consisting of maxima in the degraded real-time process data, minima in the degraded real-time process data, width in oscillation within the degraded real-time process data, and any combination thereof.

4. The method according to claim 1, wherein using the Savitzky-Golay smoothing filter comprises selecting a smoothing window depending on a period of oscillation in the degraded real-time process data.

5. The method as in claim 1, wherein calculating the stiction index comprises comparing a mean square error of the sinusoidal fitting and the sawtooth fitting.

6. The method as in claim 5, wherein the comparing comprises evaluating $$SI = \frac{MSE_{sin}}{MSE_{sin} + MSE_{tri}},$$

where MSEsin is the mean square error of the sinusoidal fitting and MSEtri is the mean square error of the sawtooth fitting, and SI is the calculated stiction index.

7. A non-transitory computer readable medium encoded with computer executable instructions for performing the method of claim 1.

8. The method according to claim 1, wherein at least one of the devices or systems is offshore.

9. The method according to claim 1, further comprising determining valve stiction in at least one degraded control loop that is a multi-loop.

10. The method according to claim 1, further comprising determining valve stiction in at least one degraded control loop that is a single loop.

11. A computer system for controlling a device in a hydrocarbon production site comprising:

a storage device storing executable instructions for performing a method; and a processor in communication with the storage device, the processor being configured to execute the instructions to cause the computer system to:

receive representative benchmark process data for a plurality of physical devices or systems in the hydrocarbon production site for a period of time of normal operation, wherein each physical device or system includes at least one valve, and wherein each valve is controlled by a controller system using one or more loops, and wherein the representative benchmark process data is selected from the group consisting of temperature, pressure, fluid flow rate, operation of a valve, and any combination thereof;

receive real-time process data for the plurality of physical devices or systems outside the period of time of said normal operation, the real-time process data being selected from the group consisting of real-time measured temperature, pressure, fluid flow rate, operation of the valve, and any combination thereof;

apply a data-driven covariance benchmark algorithm to the real-time process data and the benchmark process data corresponding to the one or more loops to determine whether the real-time process data from the plurality of devices deviates from the benchmark process data from the plurality of devices;

in response to determining that the real-time process data deviates from the benchmark process data indicating a degraded one or more loops in the one or more loops, apply an angle-based contribution algorithm to determine which one or more loops in the one or more loops are degraded, wherein a degraded one or more loops in the one or more loops is indicative of a deteriorating condition of one or more controllers controlling one or more physical devices or systems or a deteriorating condition of the one or more physical devices, or both;

apply a Savitzky-Golay smoothing filter to the real-time process data for each degraded control loop of the one or more degraded loops while preserving features of the real-time process data corresponding to the degraded one or more loops to obtain smoothed data;

apply a pattern recognition algorithm to the smoothed data to determine whether a valve stiction condition exists in the valve corresponding to each degraded control loop, wherein the pattern recognition algorithm comprises a curve fitting method, wherein the curve fitting method further comprises calculating a sinusoidal fitting, calculating a sawtooth fitting, and calculating a stiction index based on the sinusoidal fitting and the sawtooth fitting and based on a value of the calculated stiction index determining that the valve stiction condition exists in the valve corresponding to each degraded control loop; and in response to determining that the valve stiction condition exists in the valve corresponding to each degraded control loop using the pattern recognition algorithm, provide an indication of valve malfunction so that a technician takes a proper corrective action to resolve the valve malfunction.

12. The system according to claim 11, wherein at least one of the devices or systems is offshore.

13. The system according to claim 11, wherein if the stiction index is smaller than a threshold value it is determined that there is substantially no stiction of the valve, and if the stiction index is greater than the threshold value, it is determined that there is stiction in the valve.

14. The system according to claim 11, wherein applying the Savitzky-Golay smoothing filter comprises filtering the degraded real-time process data while preserving features of the degraded real-time process data, the features being selected from the group consisting of maxima in the degraded real-time process data, minima in the degraded real-time process data, width in oscillation within the degraded real-time process data, and any combination thereof.

15. The system according to claim 11, wherein using the Savitzky-Golay smoothing filter comprises selecting a smoothing window depending on a period of oscillation in the degraded real-time process data.

16. The system according to claim 11, wherein calculating the stiction index comprises comparing a mean square error of the sinusoidal fitting and the sawtooth fitting.

17. The system according to claim 16, wherein the comparing comprises evaluating $$SI = \frac{MSE_{sin}}{MSE_{sin} + MSE_{tri}},$$

where MSEsin is the mean square error of the sinusoidal fitting and MSEtri is the mean square error of the sawtooth fitting, and SI is the calculated stiction index.

18. The system according to claim 11, wherein the processor is further configured to execute the instructions to cause the computer system to determine valve stiction in at least one degraded control loop that is a multi-loop.

19. The system according to claim 11, wherein the processor is further configured to execute the instructions to cause the computer system to determine valve stiction in at least one degraded control loop that is a single loop.

\* \* \* \* \*